United States Patent [19]

Capra

[11] 4,001,907
[45] Jan. 11, 1977

[54] VEHICLE-WASHING STATION WITH SCRUBBING UNIT COMPOSED OF VERTICALLY SUPERPOSED ROTARY BRUSHES

[75] Inventor: Uberto Capra, Alte Ceccato (Venice), Italy

[73] Assignee: Ceccato & C. S.p.A., Alte Ceccato (Venice), Italy

[22] Filed: July 11, 1975

[21] Appl. No.: 595,084

[30] Foreign Application Priority Data

July 11, 1974 Italy .................................. 25003/74

[52] U.S. Cl. ............................. 15/53 A; 15/DIG. 2
[51] Int. Cl.² .......................................... B60S 3/06
[58] Field of Search .......... 15/DIG. 2, 53 A, 53 AB

[56] References Cited

UNITED STATES PATENTS 725,119    4/1903    Mc Caffery ...................... 15/53 AB

FOREIGN PATENTS OR APPLICATIONS 617,409    8/1935    Germany ......................... 15/DIG. 2
1,810,694  6/1970    Germany ......................... 15/DIG. 2

*Primary Examiner*—Edward L. Roberts
*Attorney, Agent, or Firm*—Karl F. Ross; Herbert Dubno

[57] ABSTRACT

A scrubbing unit for a vehicle-washing station, designed particularly for vehicles with vertically fluted sides, comprises an array of vertically superposed cylindrical brushes corotating on an upright support about horizontal axes which are parallel to the vehicular surface to be washed. The mutual spacing of the brush axes equals the diameter of their cylindrical bodies in the undeformed state of their bristles whereby these, on being urged against the vehicular surface to be scrubbed, are deflected against their direction of rotation to form a nearly continuous working area. Two such units mounted on the support alongside each other, with vertical staggering of their brush axes, insure uniform scrubbing over the height of the engaged surface. The support is swingable about a pivotal axis parallel to the brush axis, thus allowing the scrubbing of inclined surfaces, and is mounted on an overhead carriage reciprocable along the lintel of a portal frame with freedom of rotation about a vertical axis to let the brushes sweep both the lateral and the transverse surfaces.

9 Claims, 5 Drawing Figures

VEHICLE-WASHING STATION WITH SCRUBBING UNIT COMPOSED OF VERTICALLY SUPERPOSED ROTARY BRUSHES

FIELD OF THE INVENTION

My present invention relates to a vehicle-washing station and more particularly to a scrubbing unit adapted to sweep the more or less vertical lateral and/or transverse surfaces of the vehicle to be washed. In many existing vehicles, notably those designed for heavy-duty use, these upright surfaces are reinforced with ribbed or corrugated plates forming vertical grooves. These vehicles include trucks and trailers of the container type as well as railroad cars. The scrubbing of such fluted surfaces with conventional rotary brushes, carried on more or less vertical shafts, is only limitedly effective.

OBJECTS OF THE INVENTION

The general object of my present invention, therefore, is to provide an improved scrubbing unit for such a vehicle-washing station which can effectively sweep and cleanse, in a short period, a vertically ribbed or corrugated surface of an automotive or other vehicle.

A more particular object is to provide means in such a station for enabling the scrubbing unit to sweep the entire periphery of the vehicle.

SUMMARY OF THE INVENTION

The scrubbing unit according to my present invention, designed to act on vertically fluted vehicular surfaces, includes an array of vertically superposed cylindrical brushes on a common support, these brushes being centered on generally horizontal axes lying in a common plane and being jointly rotatable about these axes, preferably codirectionally, by associated drive means. The washing station equipped with this scrubbing unit includes guide means enabling relative horizontal displacement of the brush support and the vehicle along an upright vehicular surface to be scrubbed, the brush axes being parallel to the surface contacted by the brushes.

Advantageously, two such units are carried on the same support with their axes in vertically staggered relationship to ensure uniform scrubbing over the height of the engaged surface. The brushes of the two substantially identical units may be driven by a common motor through suitable transmission means such as endless belts or chains.

In principle, either the vehicle or the brush support can move under the control of the above-mentioned guide means during a scrubbing operation. In the preferred embodiment described hereinafter, however, the vehicle is stationary and the support is displaceable in longitudinal direction of the vehicle with the aid of a rail-borne portal frame whose lintel, lying at a level higher than the vehicle, is engaged by a carriage reciprocable therealong, the mounting of the brush support including a journal bearing on the carriage with a vertical axis of rotation whereby the brush array can be turned by suitable control means about that axis to scrub both lateral and transverse vehicular surfaces. Especially for the scrubbing of such transverse surfaces, which are frequently inclined at a small angle to the vertical, I prefer to design the brush support as an arm pivotally secured to its mounting for swinging in a vertical plane transverse to the common plane of the brush axes; this latter feature is not limited to the provision of the aforementioned carriage but can be used with any overhead mounting, movable or stationary, for that arm.

BRIEF DESCRIPTION OF THE DRAWING

The above and other features of my invention will now be described in detail with reference to the accompanying drawing in which.

SPECIFIC DESCRIPTION

Figures 1, 2:
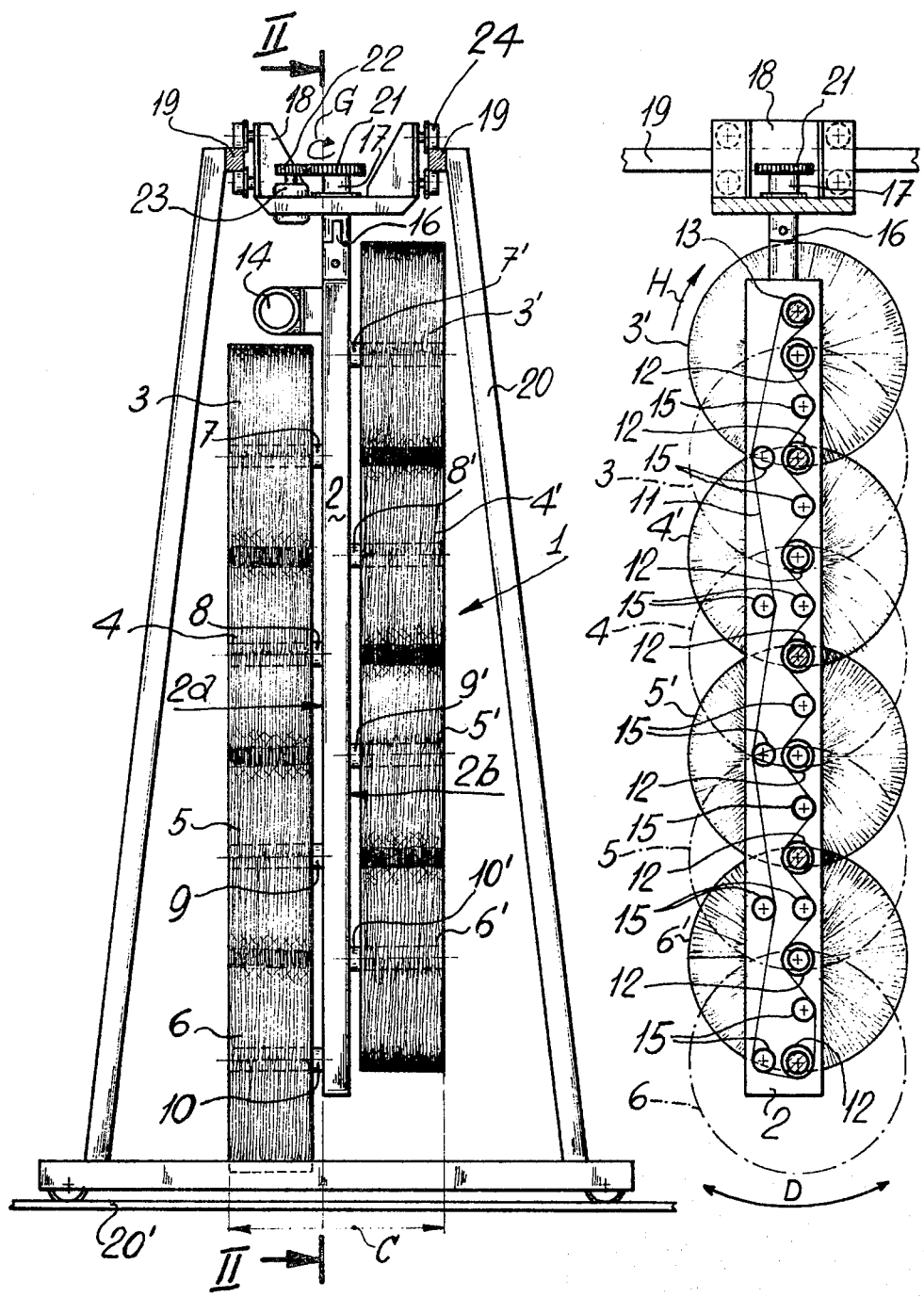
FIG. 1 is a somewhat diagrammatic side-elevational view of a vehicle-washing station including a portal frame equipped with a pair of scrubbing units embodying my invention.
FIG. 2 is a cross-sectional view taken on the line II — II of FIG. 1.
Figure 3:
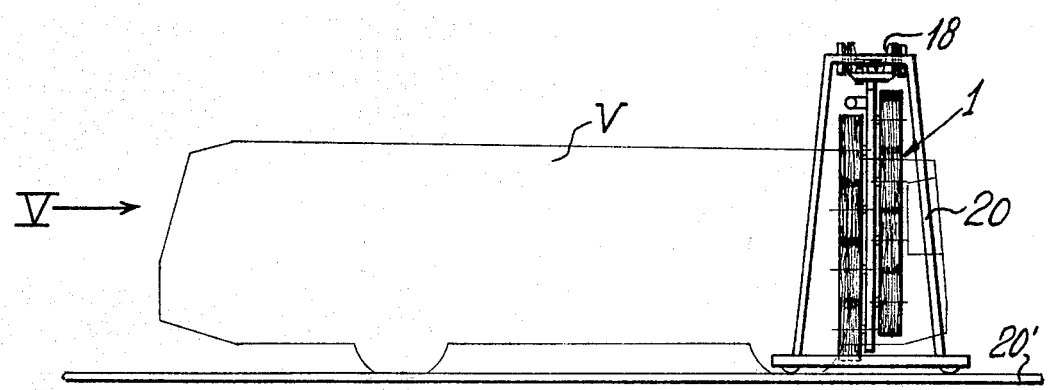
FIG. 3 is a schematic side-elevational view, drawn to a smaller scale, of the washing station of FIGS. 1 and 2 together with a vehicle treated thereat.

In the drawing I have shown a vehicle-washing station, generally designated 1, comprising a portal frame 20 with a wheeled base riding on rails 20' for longitudinal displacement with reference to a vehicle V to be washed. The frame 20 carries conventional nozzles, now shown, for the emission of wash water, detergent and drying air as is customary in such stations; it may also be equipped with one or more nonillustrated horizontal brushes for the scrubbing of the vehicle roof which is spaced from the lintel 19 of the frame. The lintel forms a track for a carriage 18 having rollers 24 enabling its transverse reciprocation along the lintel, e.g. by a drive mechanism including some of these rollers or by cables attached to the carriage for pulling it in one or the other direction (see my prior U.S. Pat. No. 3,500,487).

Carriage 18 supports a motor 23 with a pinion 22 engaging a gear 21 whose hub 17 is journaled in the carriage bottom and is hinged at 16 to the top of a depending arm 2 designed as a flat box. That arm, lying in the vertical midplane of frame 20, serves as a support for two scrubbing units comprising each a set of four vertically superposed cylindrical brushes 3 – 6 and 3' – 6', each brush having a shaft 7 – 10 and 7' – 10' which is journaled in the arm 2 and defines a horizontal axis of rotation for the cylindrical brush body consisting of flexible bristles. The vertical spacing between the axes of adjoining brushes of either unit substantially equals the diameter of the cylindrical body in the undeflected condition of its bristles; as shown, that spacing is slightly less than the brush diameter whereby the orbits of the bristles intersect, with a resulting flattening of the brush bodies along their zones of contact. A motor 14 mounted on arm 2 drives a pulley 13 in the interior of the hollow arm, this pulley being linked via an endless belt 11 with pulleys 12 on all the shafts 7 – 10 and 7' – 10' for corotating same in the clockwise direction indicated by an arrow H in FIG. 2. Belt 11 is held under suitable tension with the aid of adjustably mounted idler rollers 15. The pulleys 12, 13 may also be replaced by sprockets, with substitution of a chain for the belt 11.

Figure 4:
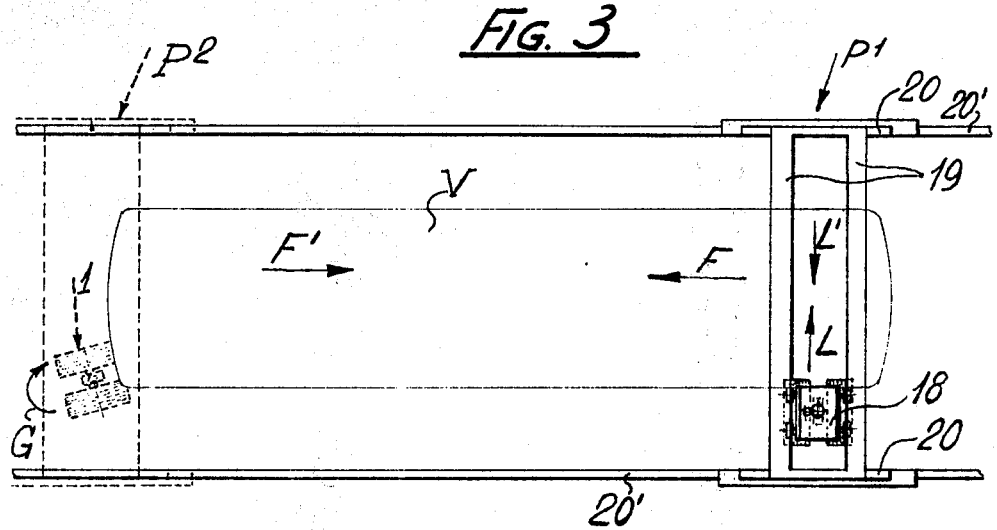
FIG. 4 is a top plan view of the washing station and the vehicle shown in FIG. 3.
Figure 5:
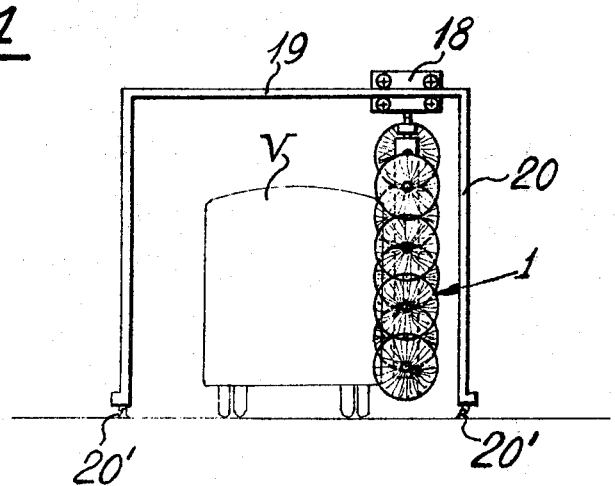
FIG. 5 is an end view as seen in the direction V in FIG. 3.

By virtue of the hinge mounting 16, the arm 2 with its brushes and associated drive means is swingable in a plane perpendicular to the common axial plane of the brush shafts, as indicated by an arrow D in FIG. 2. This pivoted suspension allows the brushes to scrub not only the vertical lateral surfaces of vehicle V, as shown in FIG. 5, but also the sloping front and back surfaces thereof as illustrated in broken lines in FIG. 4. Thus, with carriage 18 starting in a position P$^1$ as indicated in FIG. 4, frame 20 is moved rearwardly along the vehicle (arrow F) while the rotating brushes scrub the right-hand side thereof (as seen from the driver's seat) until they reach an alternate position P$^2$. At that point, motor 23 is energized manually or through a suitable programmer to rotate the hub 17 and the arm 2 with its two brush arrays to clear the corner (arrow G in FIG. 4) as the brushes start scrubbing the rear surface of the vehicle, carriage 18 moving for this purpose along lintel 19 in the direction of arrow L. Next, the frame shifts back to position P$^1$ (arrow F') with scrubbing of the left-hand side of the vehicle. Finally, the carriage returns to its original position on the lintel by moving in the direction of arrow L', with scrubbing of the vehicular front surface.

If desired, the process may be repeated with the brushes rotating in the opposite direction (counterclockwise in FIG. 2), as by turning the arm 2 through 180° or by reversing the direction of rotation of motor 14.

As will be apparent from FIGS. 1 and 2, the relative staggering of brushes shafts 7 – 10 and 7' – 10' in the vertical direction provides effective coverage over the entire height of the vehicle within a working area of width C. As the brushes are urged toward the vehicle by the drive mechanism for the carriage 18, the flexible bristles thereof deflect so that contact between each brush and the vehicular surface occurs along a section of that working area whose height is greater than the brush radius. The bristles will penetrate into any vertical groove or flute present on the surface being scrubbed.

Naturally, the scrubbing units shown in FIGS. 1 and 2 may be duplicated on opposite sides of the portal frame 20 or of a stationary tunnel structure through which the vehicle V moves under its own power or with the aid of an external drive mechanism as is well know per se.

It should also be understood that the brush support could be carried on a horizontally swingable arm of the type disclosed in my copending application Ser. No. 511,183 filed 2 Oct. 1974, now U.S. Pat. No. 3,931,660.

I claim:

1. In a vehicle-washing station, in combination: support means positionable adjacent a vehicle to be washed, said support means including an overhead mounting and a depending arm pivotally secured to said mounting for swinging in a vertical plane;
   at least one scrubbing unit on said support means including an array of vertically superposed cylindrical brushes journaled on said arm and centered on generally horizontal axes lying in a common plane transverse to said vertical plane;
   drive means for jointly rotating said brushes about their axes; and
   guide means enabling relative horizontal displacement of said support means and said vehicle along an upright vehicular surface parallel to said axes in contact with said brushes.

2. The combination defined in claim 1 wherein each of said brushes comprises a shaft rotatably supported on said arm and a body of flexible bristles radiating from said shaft.

3. The combination defined in claim 2 wherein said drive means includes transmission means linking the shafts of said brushes for codirectional rotation.

4. The combination defined in claim 3 wherein the spacing of said axes substantially equals the diameter of said body.

5. The combination defined in claim 1, further comprising another unit substantially identical with said one unit carried on said arm with relative vertical staggering of the axes of the brushes of said units.

6. The combination defined in claim 5 wherein said drive means comprises a motor common to both said units.

7. The combination defined in claim 1 wherein said support means further comprises a portal frame adapted to straddle said vehicle, said portal frame having a lintel at a level higher than said vehicle, and a carriage guided along said lintel for reciprocation therealong, said mounting being disposed on said carriage.

8. The combination defined in claim 7 wherein said mounting comprises a journal bearing with a vertical axis of rotation, further comprising control means for turning said arm together with said scrubbing unit about said axis of rotation, thereby enabling said brushes to scrub both lateral and transverse surfaces of said vehicle.

9. The combination defined in claim 8 wherein said guide means comprises a wheeled base for said portal frame and rail means engaged by said wheeled base to facilitate displacement of said portal frame longitudinally of said vehicle.

* * * * *